United States Patent
Newton et al.

(10) Patent No.: US 10,070,182 B2
(45) Date of Patent: Sep. 4, 2018

(54) APPARATUS AND METHOD FOR PREVENTING SWITCHING FROM A CHANNEL DURING AN ADVERTISEMENT DISPLAY

(71) Applicant: KONINKLIJKE PHILIPS N.V., Eindhoven (NL)

(72) Inventors: Philip Steven Newton, Waalre (NA); Declan Patrick Kelly, Shangahi (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/695,445

(22) Filed: Sep. 5, 2017

(65) Prior Publication Data
US 2017/0366846 A1    Dec. 21, 2017

Related U.S. Application Data

(63) Continuation of application No. 10/538,101, filed as application No. PCT/IB03/05688 on Dec. 4, 2003, now abandoned.
(Continued)

(51) Int. Cl.
*H04H 60/33* (2008.01)
*H04N 21/443* (2011.01)
(Continued)

(52) U.S. Cl.
CPC ........ *H04N 21/4433* (2013.01); *H04H 60/13* (2013.01); *H04H 60/15* (2013.01); *H04H 60/16* (2013.01); *H04H 60/21* (2013.01); *H04N 5/783* (2013.01); *H04N 7/163* (2013.01); *H04N 7/165* (2013.01); *H04N 21/235* (2013.01); *H04N 21/2543* (2013.01); *H04N 21/435* (2013.01); *H04N 21/4383* (2013.01); *H04N 21/443* (2013.01); *H04N 21/440281* (2013.01);
(Continued)

(58) Field of Classification Search
CPC ........... H04N 21/4433; H04N 21/2543; H04N 21/435; H04N 21/6543; H04N 21/812
See application file for complete search history.

(56) References Cited

U.S. PATENT DOCUMENTS 5,446,488 A    8/1995 Vogel
5,532,735 A    7/1996 Blahut et al.
(Continued)

FOREIGN PATENT DOCUMENTS

EP    0817486 A2    1/1998
EP    1111924 A1    6/2001
(Continued)

*Primary Examiner* — Kunal Langhnoja

(57) ABSTRACT

An apparatus and method is disclosed for preventing a viewer from switching from a channel when an advertisement is being displayed on the channel. The apparatus and method comprises an advertisement controller in a video playback device that (1) prevents a viewer of a direct (non-recorded) broadcast from switching channels when an advertisement is displayed, and (2) prevents a viewer of a recorded program from fast forwarding the recorded program in order to skip past advertisements that were recorded with the program. A viewer may either watch the advertisements or pay a fee in order to be able to change channels or fast forward when the advertisements are being displayed.

16 Claims, 7 Drawing Sheets

Related U.S. Application Data

(60) Provisional application No. 60/432,940, filed on Dec. 12, 2002.

(51) Int. Cl.
| | | |
|---|---|---|
| *H04N 21/81* | (2011.01) | |
| *H04H 60/13* | (2008.01) | |
| *H04N 21/6543* | (2011.01) | |
| *H04N 21/488* | (2011.01) | |
| *H04N 21/458* | (2011.01) | |
| *H04N 21/4402* | (2011.01) | |
| *H04N 21/438* | (2011.01) | |
| *H04N 21/435* | (2011.01) | |
| *H04N 21/2543* | (2011.01) | |
| *H04N 21/235* | (2011.01) | |
| *H04N 7/16* | (2011.01) | |
| *H04N 5/783* | (2006.01) | |
| *H04H 60/21* | (2008.01) | |
| *H04H 60/16* | (2008.01) | |
| *H04H 60/15* | (2008.01) | |

(52) U.S. Cl.
CPC ....... *H04N 21/458* (2013.01); *H04N 21/4882* (2013.01); *H04N 21/6543* (2013.01); *H04N 21/812* (2013.01); *H04N 21/8166* (2013.01)

(56) References Cited

U.S. PATENT DOCUMENTS

| | | | |
|---|---|---|---|
| 5,943,605 A | 8/1999 | Koepele, Jr. | |
| 6,020,882 A | 2/2000 | Kinghorn et al. | |
| 6,100,916 A | 8/2000 | August et al. | |
| 6,993,727 B2* | 1/2006 | De Ceulaer | H04N 5/44543 |
| | | | 348/E5.105 |
| 2001/0054181 A1* | 12/2001 | Corvin | G06Q 30/02 |
| | | | 725/42 |
| 2002/0144262 A1 | 10/2002 | Plotnick et al. | |
| 2002/0144274 A1* | 10/2002 | Gaviot | H04N 7/165 |
| | | | 725/86 |
| 2002/0191950 A1* | 12/2002 | Wang | G11B 27/105 |
| | | | 386/231 |
| 2004/0031052 A1 | 2/2004 | Wannamaker et al. | |
| 2007/0067800 A1 | 3/2007 | Wachtfogel et al. | |

FOREIGN PATENT DOCUMENTS

| | | |
|---|---|---|
| JP | H11112903 A | 4/1999 |
| JP | 2001223653 1A | 8/2001 |
| JP | 2002183587 A | 6/2002 |
| JP | 2002251157 A | 9/2002 |
| WO | 9937045 A1 | 7/1999 |
| WO | 9948296 A1 | 9/1999 |
| WO | 0001149 A | 1/2000 |
| WO | 0176249 A1 | 10/2001 |

* cited by examiner

APPARATUS AND METHOD FOR PREVENTING SWITCHING FROM A CHANNEL DURING AN ADVERTISEMENT DISPLAY

CROSS REFERENCE TO RELATED APPLICATIONS

This application is a Continuation of application Ser. No. 10/538,101, filed Jun. 8, 2005, which is a U.S. National Phase application under 35 U.S.C. § 371 of International Application No. PCT/IB2003/05688, filed Dec. 4, 2003, which claims the benefit of U.S. Provisional Application Ser. No. 60/432,940 filed Dec. 12, 2002.

TECHNICAL FIELD OF THE INVENTION

The present invention is generally directed to video image display systems, and, in particular, to an apparatus and method for preventing a viewer from switching from a channel when an advertisement is being displayed.

BACKGROUND OF THE INVENTION

A wide variety of video playback devices are available in the marketplace. Most people own, or are familiar with, a video cassette recorder (VCR). A video tape recorder (VTR) is another type of video playback device. More recently, video recorders that use computer magnetic hard disks rather than magnetic cassette tapes to store video programs have appeared in the market. For example, the ReplayTV™ recorder and the TiVO™ recorder digitally record television programs on hard disk drives using, for example, MPEG-2 compression. Additionally, some video playback devices may record on a readable/writable digital versatile disk (DVD) rather than a magnetic disk.

Often when a viewer is watching a video program that has been recorded on a video playback device, the viewer will give the video playback device a "fast forward" command to cause the video playback device to skip past the advertisements that have been recorded with the program. In those cases where a viewer is watching a direct (non-recorded) broadcast of a program with advertisements the viewer will often switch to another channel when an advertisement is being displayed.

This is undesirable for program broadcasters because the advertisements that are broadcast with the programs pay for the programs. Advertisers pay the program broadcasters to broadcast advertisements in order to deliver the advertisements to the viewing public. The program broadcasters therefore have an interest in seeing that the advertisements are viewed and not ignored.

There is therefore a need in the art for a video display system that is capable of preventing a viewer of a direct (non-recorded) broadcast from switching from a first channel to a second channel when an advertisement is displayed on the first channel. There is also a need in the art for a video display system that is capable of preventing a viewer of a recorded program from fast forwarding the recorded program in order to skip past advertisements that were recorded with the program.

SUMMARY OF THE INVENTION

To address the above-discussed deficiencies of the prior art, it is a primary object of the present invention to provide, for use in a video display system that is capable of displaying a video program and advertisements, an apparatus and method that prevents a viewer from switching channels when an advertisement is being displayed.

It is also a primary object of the present invention to provide, for use in a video display system that is capable of displaying a video program and advertisements, an apparatus and method that prevents a viewer from fast forwarding a recorded program to skip past advertisements in the recorded program.

In one advantageous embodiment, the present invention comprises an advertisement controller and advertisement control software in a video playback device. The advertisement controller executes advertisement control software to activate a first Multimedia Home Platform (MHP) application. The first MHP application detects a first control signal in a broadcast that requests exclusive control of the channel switching function of the video playback device. The first MHP application notifies the viewer that the advertisements must be viewed in order to view the content of the program. If the viewer does nothing for a selected period of time, the viewer is deemed to have accepted the requirement that the advertisements be viewed in order to view the program content.

The first MHP application then takes exclusive control of the channel switching function. Any attempt by the viewer to switch channels during an advertisement is then disregarded. At a later time the first MHP application detects a second control signal requesting the first MHP application to release the exclusive control of the channel switching function. The first MHP application then releases control and returns to the viewer the ability to switch channels during advertisements.

The first MHP application operates similarly in the case of a recorded program. For a recorded program the exclusive control is over the fast forwarding function of the video playback device.

According to an advantageous embodiment of the present invention, the advertisement controller may also comprise a second MHP application that is capable of preventing the first MHP application from obtaining exclusive control of the channel switching function or the fast forwarding function.

According to an advantageous embodiment of the present invention, the advertisement controller may also comprise a third MHP application that is capable of sending a payment authorization from a viewer to a program broadcaster to authorize the viewer to switch channels during a display of an advertisement in a broadcast video program and fast forward a recorded video program during a display of an advertisement in the recorded video program.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. In the description of the exemplary embodiment that follows, the present invention is integrated into, or is used in connection with, a digital television receiver and a digital television broadcast system. However, this embodiment is by way of example only and should not be construed to limit the scope of the present invention to television receivers and to television broadcast systems. In fact, those skilled in the art will recognize that the exemplary embodiment of the present invention may easily be modified for use in any type of video display system and video broadcast system.

Figure 1:
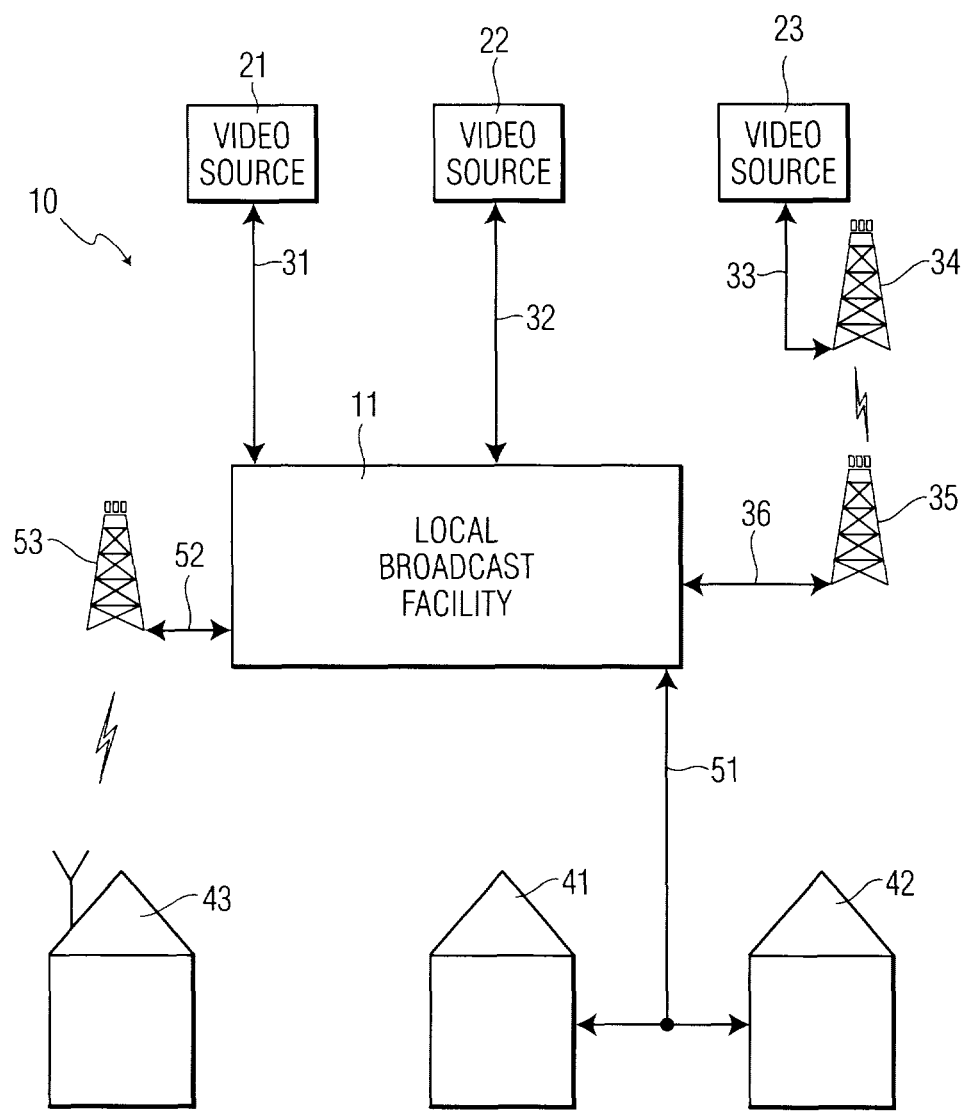
FIG. 1 illustrates an exemplary prior art digital television broadcast system.

FIG. 1 illustrates an exemplary prior art digital television broadcast system 10. Digital television broadcast system 10 comprises local broadcast facility 11. Local broadcast system 11 receives one or more digital video transport streams from a first video source 21, from a second video source 22, and from a third video source 23. Local broadcast facility 11 may receive these digital video transport streams from wireline communication links or from wireless communication links. For example, local broadcast facility 11 receives one or more digital video transport streams from first video source 21 via wireline communication link 31 and receives one or more digital video transport streams from second video source 22 via wireline communication link 32.

Local broadcast facility 11 also comprises base transceiver station 34 and base transceiver station 35 which wirelessly transmit one or more digital video transport streams from third video source 23 to local broadcast facility 11. In an exemplary embodiment, third video source 23 may transmit the digital video transport streams via communication line 33 to base transceiver station 34 which is a part of a local multipoint distribution system (LMDS) network. In an LMDS network, a microwave link is used to transmit the digital video transport streams from base transceiver station 34 to base transceiver station 35. Communication line 36 carries the digital video transport streams from base transceiver station 35 to local broadcast facility 11.

Local broadcast facility 11 transmits the digital video transport streams to subscriber locations 41, 42 and 43, which may include both private residences and business locations. If local broadcast facility 11 is part of a cable television system, local broadcast facility 11 may transmit one or more outbound digital video transport streams to subscriber locations 41 and 42 via communication wireline 51. Communication wireline 52 carries one or more outbound digital video transport streams from local broadcast facility 11 to transmitter 53, which wirelessly transmits the outbound digital signal video transport streams to subscriber location 43.

Each of the digital video transport streams received by and transmitted by local broadcast facility 11 is carried in a six megahertz (6 MHz) broadcast channel. A transport stream usually contains several virtual channels, with each virtual channel containing a program. The program carried in a virtual channel is what a viewer sees on a single television channel, such as a movie, a newscast, and a weather channel. Normally, each virtual channel is allocated a fixed bandwidth such as three megabits per second (3 Mbps).

In the description of the present invention that follows, an advertisement controller controls the ability of a viewer to switch channels (or to fast forward a recorded program) when an advertisement is being displayed. In one advantageous embodiment of the present invention, the advertisement controller is implemented in a video playback device comprising a disk-based video recorder. Those skilled in the art will understand that this is by way of example only and should not be construed so as to limit the scope of the present invention. In alternate advantageous embodiments of the present invention, the advertisement controller may be implemented in a television set, in a conventional video cassette recorder (VCR), in a cable television converter box, or in a satellite dish control box.

Figure 2:
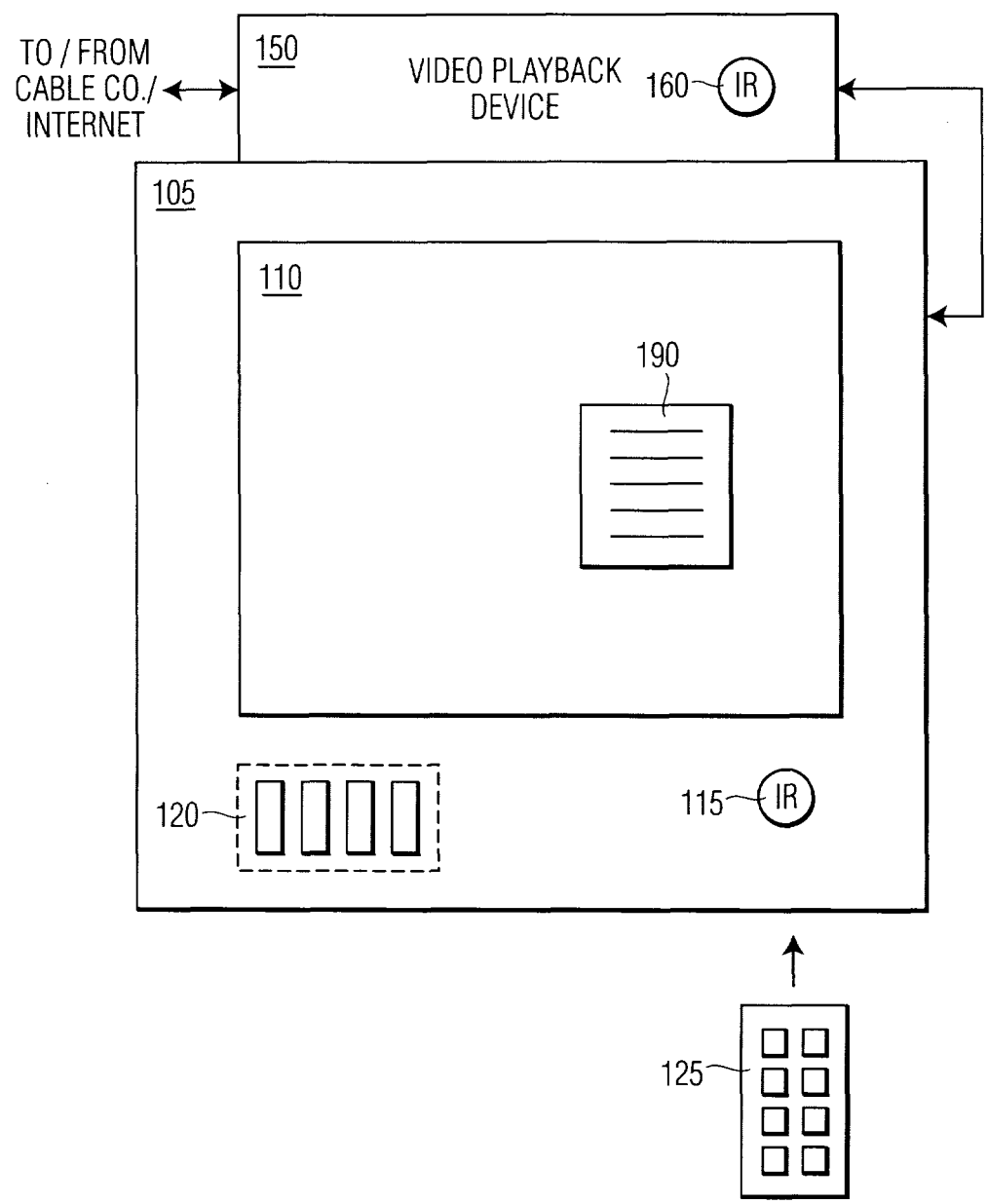
FIG. 2 illustrates a television receiver and a video playback device according to an advantageous embodiment of the present invention.

FIG. 2 illustrates exemplary video playback device 150 and television set 105 according to an advantageous embodiment of the present invention. Video playback device 150 receives incoming television signals from local broadcast facility 11, which may be a cable television service provider (Cable Co.) or an Internet service provider (ISP). Video playback device 150 transmits television signals from a selected channel to television set 105. A channel may be selected manually by the user or may be selected automatically by a recording device previously programmed by the user. Alternatively, a channel and a video program may be selected automatically by a recording device based upon information from a program profile in the user's personal viewing history.

In Record mode, video playback device 150 may demodulate an incoming radio frequency (RF) television signal to produce a baseband video signal that is recorded and stored on a storage medium within or connected to video playback device 150. In Play mode, video playback device 150 reads a stored baseband video signal (i.e., a program) selected by the user from the storage medium and transmits it to television set 105. Video playback device 150 may comprise a video recorder of the type that is capable of receiving, recording, interacting with, and playing digital signals.

Video playback device 150 may comprise a video recorder of the type that utilizes recording tape, or that utilizes a hard disk, or that utilizes solid state memory, or that utilizes any other type of recording apparatus. If video playback device 150 is a video cassette recorder (VCR), video playback device 150 stores and retrieves the incoming television signals to and from a magnetic cassette tape. If video playback device 150 is a disk drive-based device, such as a ReplayTV™ recorder or a TiVO™ recorder, video playback device 150 stores and retrieves the incoming television signals to and from a computer magnetic hard disk rather than a magnetic cassette tape, and retrieves stored television signals from the hard disk. In still other embodiments, video playback device 150 may store and retrieve from a local read/write (R/W) digital versatile disk (DVD) or a read/write (R/W) compact disk (CD-RW). The local storage medium may be fixed (e.g., hard disk drive) or may be removable (e.g., DVD, CD-ROM).

Video playback device 150 comprises infrared (IR) sensor 160 that receives commands (such as Channel Up, Channel Down, Volume Up, Volume Down, Record, Play, Fast Forward (FF), Reverse, and the like) from remote control device 125 operated by the user. Television set 105 is a conventional television comprising screen 110, infrared (IR) sensor 115, and one or more manual controls 120 (indicated by a dotted line). Video playback device 150 is also capable of displaying a text message 190 on screen 110. IR sensor 115 also receives commands (such as Volume Up, Volume Down, Power On, Power Off) from remote control device 125 operated by the user.

It should be noted that video playback device 150 is not limited to receiving a particular type of incoming television signal from a particular type of source. As noted above, the external source may be a cable service provider, a conventional RF broadcast antenna, a satellite dish, an Internet connection, or another local storage device, such as a DVD player or a VHS tape player. In some embodiments, video playback device 150 may not even be able to record, but may be limited to playing back television signals that are retrieved from a removable DVD or CD-ROM. Thus, the incoming signal may be a digital signal, an analog signal, or Internet protocol (IP) packets.

However, for purposes of simplicity and clarity in explaining the principles of the present invention, the descriptions that follow shall generally be directed to an embodiment in which video playback device 150 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

Figure 3:
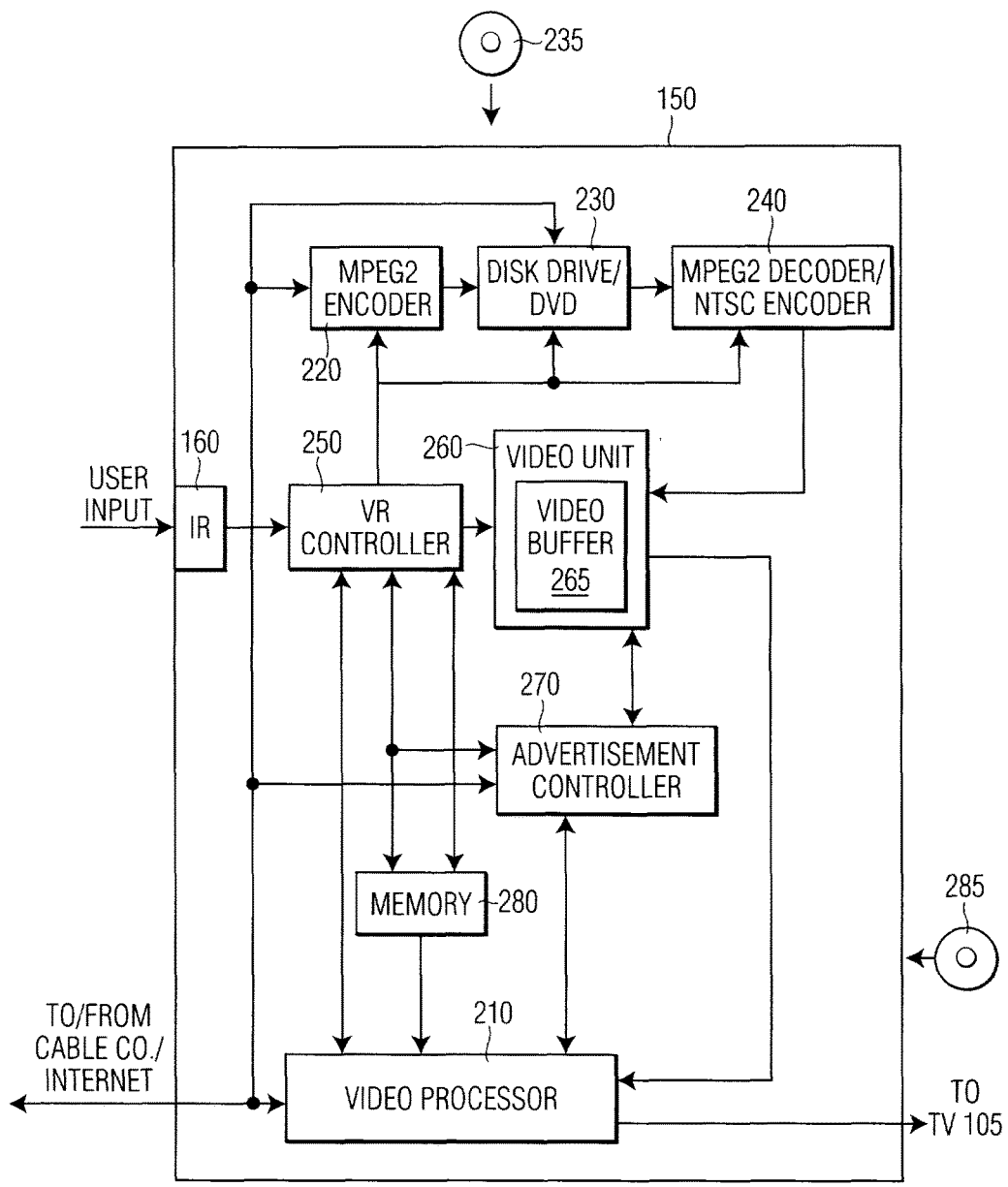
FIG. 3 illustrates a block diagram showing a more detailed view of the video playback device in FIG. 2 according to an advantageous embodiment of the present invention.

FIG. 3 illustrates exemplary video playback device 150 in greater detail according to an advantageous embodiment of the present invention. Video playback device 150 comprises IR sensor 160, video processor 210, MPEG2 encoder 220, hard disk drive 230, MPEG2 decoder/NTSC encoder 240, and video recorder (VR) controller 250. Video playback device 150 further comprises video unit 260 comprising video buffer 265, advertisement controller 270, and memory 280. VR controller 250 directs the overall operation of video playback device 150, including View mode, Record mode, Play mode, Fast Forward (FF) mode, Reverse mode, and other similar functions. Advertisement controller 270 directs the display of advertisements in accordance with the principles of the present invention.

In View mode, VR controller 250 causes the incoming television signal from the cable service provider to be demodulated and processed by video processor 210 and transmitted to television set 105, with or without storing video signals on (or retrieving video signals from) hard disk drive 230. Video processor 210 contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional NTSC signal from MPEG2 decoder/NTSC encoder 240 (after buffering in video buffer 265 of video unit 260) during Play mode and transmitting a baseband television signal to television set 105.

In Record mode, VR controller 250 causes the incoming television signal to be stored on hard disk drive 230. Under the control of VR controller 250, MPEG2 encoder 220 receives an incoming analog television signal from the cable service provider and converts the received RF signal to the MPEG2 format for storage on hard disk drive 230. Alternatively, if video playback device 150 is coupled to a source that is transmitting MPEG2 data, the incoming MPEG2 data may bypass MPEG2 encoder 220 and be stored directly on hard disk drive 230.

In Play mode, VR controller 250 directs hard disk drive 230 to stream the stored television signal (i.e., a program) to MPEG2 decoder/NTSC encoder 240, which converts the MPEG2 data from hard disk drive 230 to, for example, a super video (S-Video) signal that video processor 210 transmits to television set 105.

It should be noted that the choice of the MPEG2 standard for MPEG2 encoder 220 and MPEG2 decoder/NTSC encoder 240 is by way of illustration only. In alternate embodiments of the present invention, the MPEG encoder and decoder may comply with one or more of the MPEG-1, MPEG-2, MPEG-4, and MPEG-7 standards, or with one or more other types of standards.

For the purposes of this application and the claims that follow, hard disk drive 230 is defined to include any mass storage device that is both readable and writable, including, but not limited to, conventional magnetic disk drives and optical disk drives for read/write digital versatile disks (DVD-RW), re-writable CD-ROMs, VCR tapes and the like. In fact, hard disk drive 230 need not be fixed in the conventional sense that it is permanently embedded in video playback device 150. Rather, hard disk drive 230 includes any mass storage device that is dedicated to video playback device 150 for the purpose of storing recorded video programs. Thus, hard disk drive 230 may include an attached peripheral drive or removable disk drives (whether embedded or attached), such as a juke box device (not shown) that holds several read/write DVDs or re-writable CD-ROMs. As illustrated schematically in FIG. 3, removable disk drives of this type are capable of receiving and reading re-writable CD-ROM disk 235.

Furthermore, in an advantageous embodiment of the present invention, hard disk drive 230 may include external mass storage devices that video playback device 150 may access and control via a network connection (e.g., Internet protocol (IP) connection), including, for example, a disk drive in the viewer's home personal computer (PC) or a disk drive on a server at the viewer's Internet service provider (ISP).

VR controller 250 obtains information from video processor 210 concerning video signals that are received by video processor 210. When VR controller 250 determines that video playback device 150 is receiving a video program, VR controller 250 determines if the video program is one that has been selected to be recorded. If the video program is to be recorded, then VR controller 250 causes the video program to be recorded on hard disk drive 230 in the manner previously described. If the video program is not to be recorded, then VR controller 250 causes the video program to be processed by video processor 210 and transmitted to television set 105 in the manner previously described.

In an exemplary embodiment of the present invention, memory 280 may comprise random access memory (RAM) or a combination of random access memory (RAM) and read only memory (ROM). Memory 280 may comprise a non-volatile random access memory (RAM), such as flash memory. In an alternate advantageous embodiment of television set 105, memory 280 may comprise a mass storage data device, such as a hard disk drive (not shown). Memory 280 may also include an attached peripheral drive or removable disk drives (whether embedded or attached) that reads read/write DVDs or re-writable CD-ROMs. As illustrated schematically in FIG. 3, removable disk drives of this type are capable of receiving and reading re-writable CD-ROM disk 285.

Figure 4:
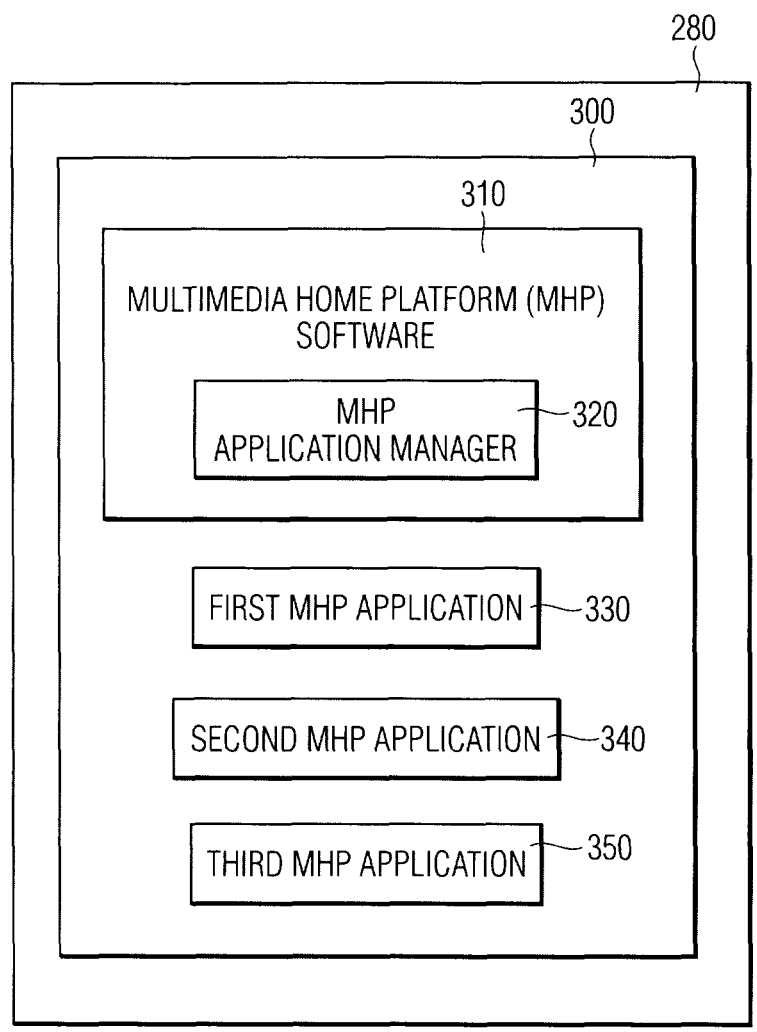
FIG. 4 illustrates advertisement control software for use in one advantageous embodiment of the present invention.

FIG. 4 illustrates a selected portion of memory 280 that contains advertisement control software 300 of the present invention. Advertisement control software 300 may also be stored on CD-ROM disk 285. Memory 280 contains Multimedia Home Platform (MHP) software 310. MHP software 310 comprises an MHP application manager 320. Advertisement control software 300 also comprises a first MHP application 330, a second MHP application, and a third MHP application. The function of the three MHP applications (330, 340, 350) will be more fully described below. Advertisement controller 270 and advertisement control software 300 together comprise an advertisement control system that is capable of carrying out the present invention. Multimedia Home Platform (MHP) software 310 coordinates the operation of advertisement control software 300 with the operating system of VR controller 250 and with advertisement controller 270.

First consider the case of a direct (non-recorded) program that is broadcast with advertisements. The program is displayed on screen 110 of television 105 by playback device 150 as previously described. When a program broadcaster desires to prevent viewers from changing channels during the advertisements the program broadcaster causes a first control signal to be inserted into the program broadcast. The first control signal instructs advertisement controller 270 to take exclusive control of the channel switching function.

First MHP application 330 is capable of detecting the first control signal. When first MHP application 330 detects the first control signal, first MHP application 330 then notifies the viewer that the advertisements associated with the program must be viewed in order to view the content of the program. First MHP application 330 notifies the viewer of this requirement by generating and displaying a text message 190 on the screen 110 of television 105.

First MHP application 330 then waits for a selected period of time to give the viewer an opportunity to change channels. If the viewer continues to watch the program and does not change channels, then first MHP application 330 takes exclusive control of the channel switching function.

First MHP application 330 can take exclusive control of the channel switching function by using a MHP Application Program Interface (API). An API is an interface between an application and a particular feature, function or resource of the Multimedia Home Platform. In MHP an application can request exclusive access to input events from the viewer. This means that an application can request exclusive access to the remote control keys that are used for switching channels.

In particular, first MHP application 330 is able to take exclusive control of the channel switching function by using an org.dvb.event API of MHP. The org.dvb.event API provides first MHP application 330 with a method to register to receive user events from the remote control (here, remote control 125). Using the org.dvb.event API first MHP application 330 requests exclusive access to certain remote control key events so that no other application will be able to receive those events.

This may be accomplished by using the MHP Event Manager and the MHP method entitled "addExclusiveAccessToAWTEvent( . . . )". For additional detail concerning this method, consult the Multimedia Home Platform (MHP) Specification (Page 343 of the June 2002 version), which is incorporated herein by reference.

The MHP Specification also states that when an MHP application desires to receive events other than the color and teletext keys, the MHP application must display a non-transparent graphics object on the display screen (Pages 111-112 of the June 2002 version). In accordance with this requirement, first MHP application 330 also generates and displays a graphics object (e.g., a small bar at the bottom of screen 110) that indicates that the viewer no longer has the ability to change channels during advertisements.

During the time that first MHP application 330 retains exclusive control of the channel switching function, first MHP application 330 disregards any attempt of the viewer to change channels during the time that advertisements are being displayed.

When a program broadcaster desires to enable the viewers to change channels during advertisements the program broadcaster causes a second control signal to be inserted into the program broadcast. The second control signal instructs advertisement controller 270 to release exclusive control of the channel switching function during advertisements. When first MHP application 330 detects the second control signal, first MHP application 330 releases the exclusive control of the channel switching function during advertisements. The second control signal will usually be sent at the end of a program.

The first control signal and the second control signal generally designate a block of video program during which the channel switching function is under the exclusive control of advertisement controller 270. Strictly speaking, the ability to switch channels will not be taken from the viewer until the expiration of the selected period of time after the viewer has received notification that the advertisements must be viewed. The viewer acknowledges and accepts the notification when the viewer takes no action for the selected period of time.

The acceptance of the viewer (expressed by taking no action) is required in order for advertisement controller 270 to take exclusive control of the channel switching function. For example, assume that before the expiration of the selected period of time after a notification, the viewer switched to a second channel and the second channel was showing an advertisement. The viewer would be able to continue to switch to other channels from the second channel. This is because the viewer did not accept the notification that had previously been given on the second channel.

The process described above is generally the same in the case of a previously recorded program with advertisements that is displayed on video playback device 150. First MHP application 330 detects a first control signal in the recorded program to take exclusive control of the fast forward function of video playback device 150. First MHP application 330 displays a text message 190 on screen 110 of television 105 notifying the viewer that the advertisements must be viewed with the program content. If the viewer takes no action within a selected period of time, first MHP application 330 takes exclusive control of the fast forward function of video playback device 150. First MHP application 330 then disregards any attempt of the viewer to fast forward the recorded program during the time that the advertisements are being displayed. When first MHP application 330 detects a second control signal, first MHP application 330 releases the exclusive control of the fast forwarding function of video playback device 150 during advertisements.

For a program broadcaster to be able to force viewers to watch advertisements may be greatly resented by the viewers. The manufacturer of a video display device (such as a set top box) has no way to ensure that a program broadcaster will notify the viewers and explain why the viewers are no longer able to switch channels during advertisements. When the remote control keys of the video playback device cease to change channels during advertisements there is a very strong likelihood that the viewers will blame the video display device (and the manufacturer of the video display device) instead of the program broadcaster.

Second MHP application 340 solves this problem by providing an apparatus and method that can prevent first MHP application 330 from taking exclusive control of the channel switching function. Second MHP application 340 is capable of blocking the access of first MHP application 330 to the channel switching function (and the fast forwarding function for a recorded program). Activating second MHP application 340 ensures that the viewer will always be able to change channels (or fast forward) during advertisements.

This is possible because in MHP access to resources (such as key events) is always subject to the resources being available. MHP Application Manager 320 can prevent other MHP applications (such as first MHP application 330) from getting exclusive access to the remote control keys.

In an alternative embodiment of the invention, the function of second MHP application 340 may be performed by MHP software 310.

The program broadcasters, in response to the use of second MHP application 340 to block the access of first MHP application 330 to the remote control keys, could decide that the program content will not be displayed if the program broadcasters are not allowed to disable channel switching (and fast forwarding) during advertisements.

One way to resolve such an impasse would be to establish a payment arrangement between the viewer and the program broadcaster. If the viewer wishes to be able to change channels or fast forward during advertisements, the viewer sends a payment authorization to make a payment to the program broadcaster. The payment arrangement is executed by third MHP application 350. Third MHP application 350 keeps track of the amount of time (or the number of programs) in which the viewer elected to change channels or fast forward during advertisements. Third MHP application 350 may communicate with the broadcast site (or other location) via a return channel (not shown). Third MHP application 350 may send payment information and viewer statistics concerning how many viewers watch advertisements and how many viewers pay to switch channels or fast forward during advertisements.

The viewer has three options. First, the viewer can watch the advertisements by allowing first MHP application 330 to have exclusive control of the channel switching function (and fast forwarding function) when the advertisements are displayed. Second, the viewer can use second MHP application 340 to block the access of first MHP application 330 and risk that the program content will not be displayed. Third, the viewer can use third MHP application 350 to send a payment authorization to the program broadcaster to pay for the right to change channels (and fast forward) when the advertisements are displayed.

Figure 5:
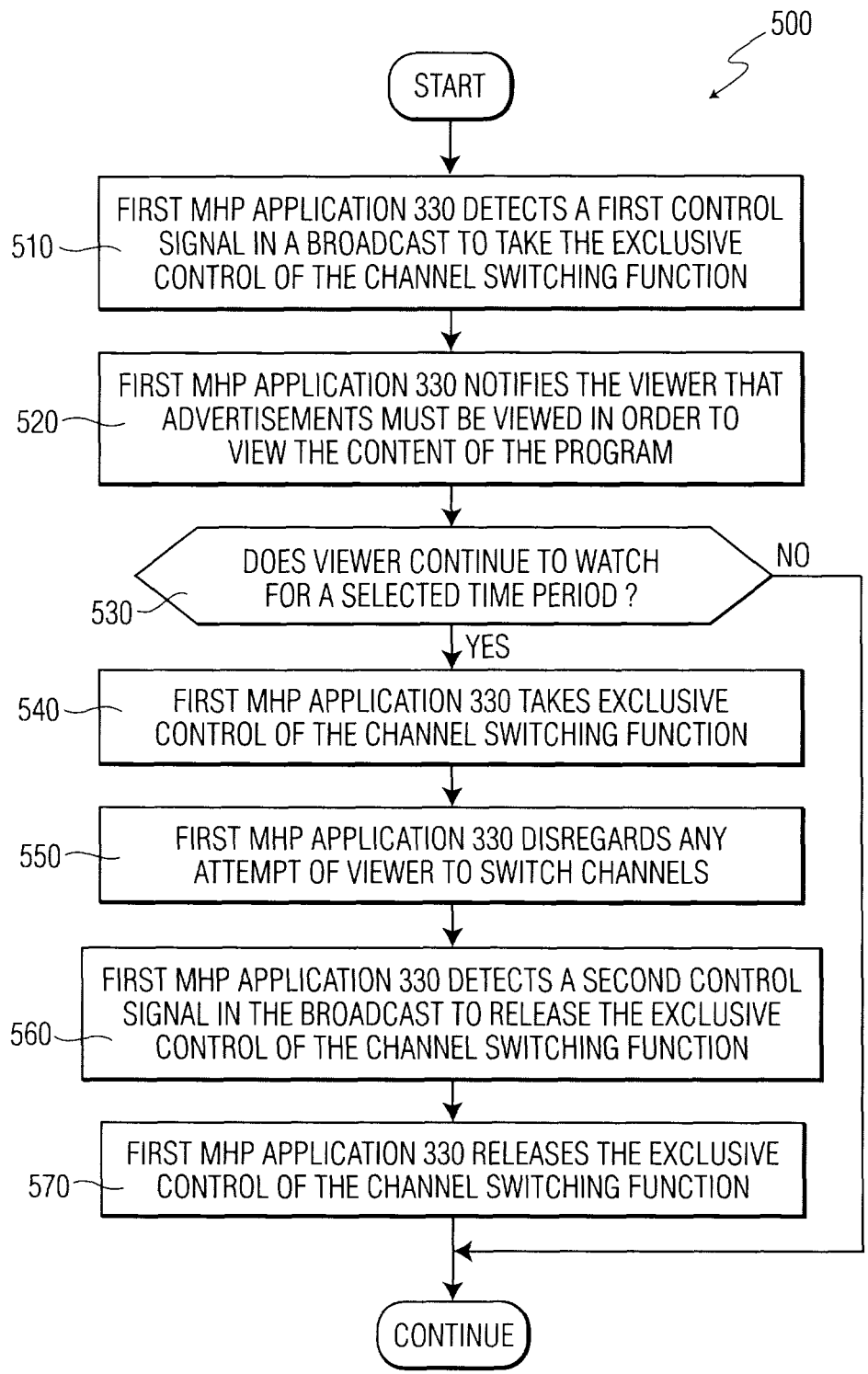
FIG. 5 illustrates a flow diagram of the operation of a method of one advantageous embodiment of the present invention for obtaining exclusive control over a channel switching function.

FIG. 5 depicts flow diagram 500 illustrating the operation of the method of an advantageous embodiment of the present invention for preventing a viewer from switching channels when an advertisement is being displayed. In the first step of the method first MHP application 330 detects a first control signal in a broadcast to take the exclusive control of the channel switching function (step 510). First MHP application 330 then notifies the viewer that advertisements must be viewed in order to view the content of the program (step 520). First MHP application then waits for a selected time period and determines whether the viewer continues to watch the program for the selected time period (decision step 530). If the viewer does not continue to watch the program for the selected time period, the method continues.

If the viewer does continue to watch the program for the selected time period, first MHP application 330 takes exclusive control of the channel switching function (step 540). First MHP application 330 disregards any attempt of the viewer to switch channels (step 550). First MHP application 330 then detects a second control signal in the broadcast to release the exclusive control of the channel switching function (step 560). First MHP application 330 then releases the exclusive control of the channel switching function (step 570) and the method continues.

Figure 6:
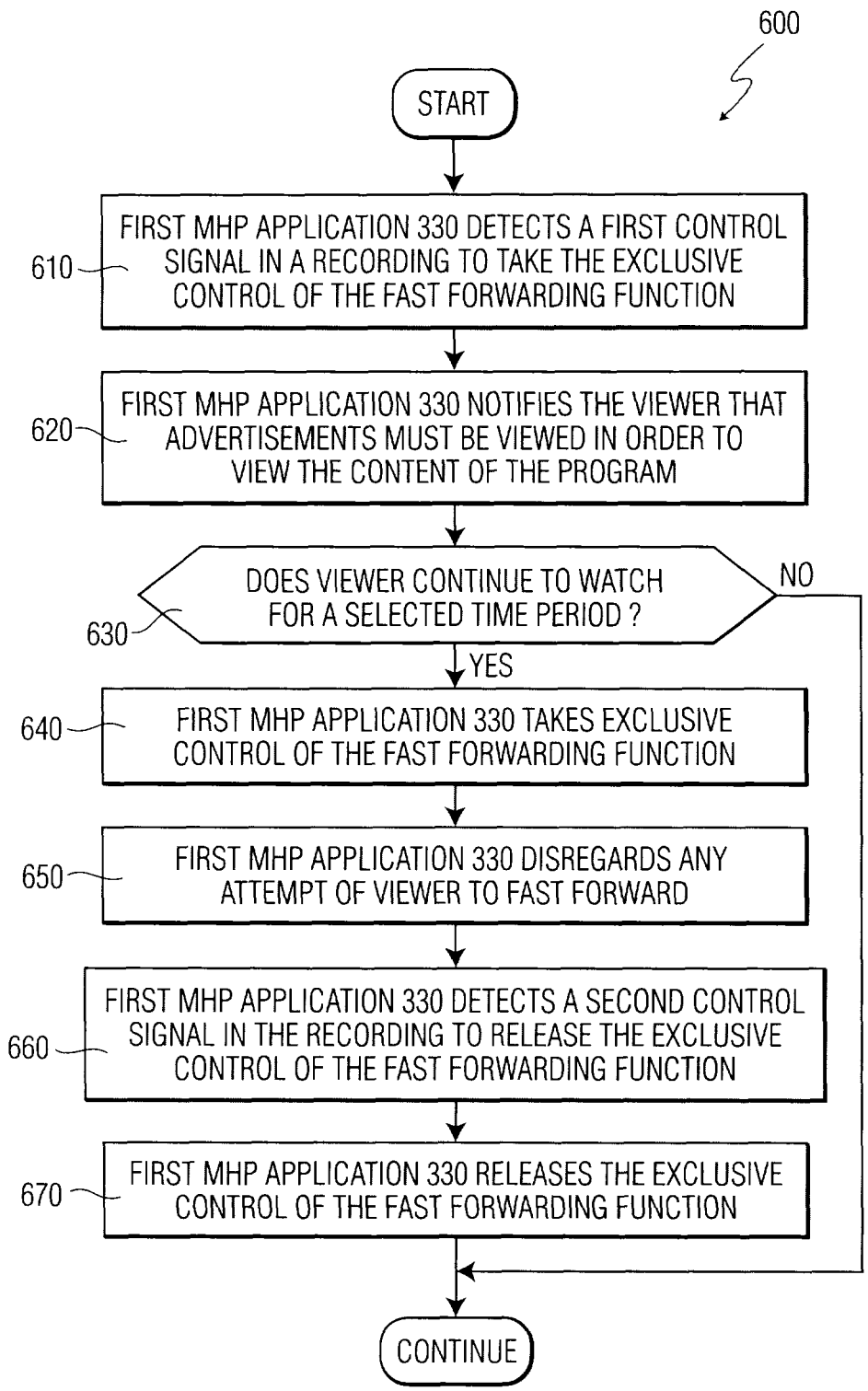
FIG. 6 illustrates a flow diagram of the operation of a method of one advantageous embodiment of the present invention for obtaining exclusive control over a fast forwarding function.

FIG. 6 depicts flow diagram 600 illustrating the operation of the method of an advantageous embodiment of the present invention for preventing a viewer from fast forwarding a recorded program when an advertisement is being displayed. In the first step of the method first MHP application 330 detects a first control signal in a recording to take the exclusive control of the fast forward function (step 610). First MHP application 330 then notifies the viewer that advertisements must be viewed in order to view the content of the program (step 620). First MHP application then waits for a selected time period and determines whether the viewer continues to watch the program for the selected time period (decision step 630). If the viewer does not continue to watch the program for the selected time period, the method continues.

If the viewer does continue to watch the program for the selected time period, first MHP application 330 takes exclusive control of the fast forwarding function (step 640). First MHP application 330 disregards any attempt of the viewer to fast forward the recording (step 650). First MHP application 330 then detects a second control signal in the recording to release the exclusive control of the channel switching function (step 660). First MHP application 330 then releases the exclusive control of the fast forwarding function (step 670) and the method continues.

Figure 7:
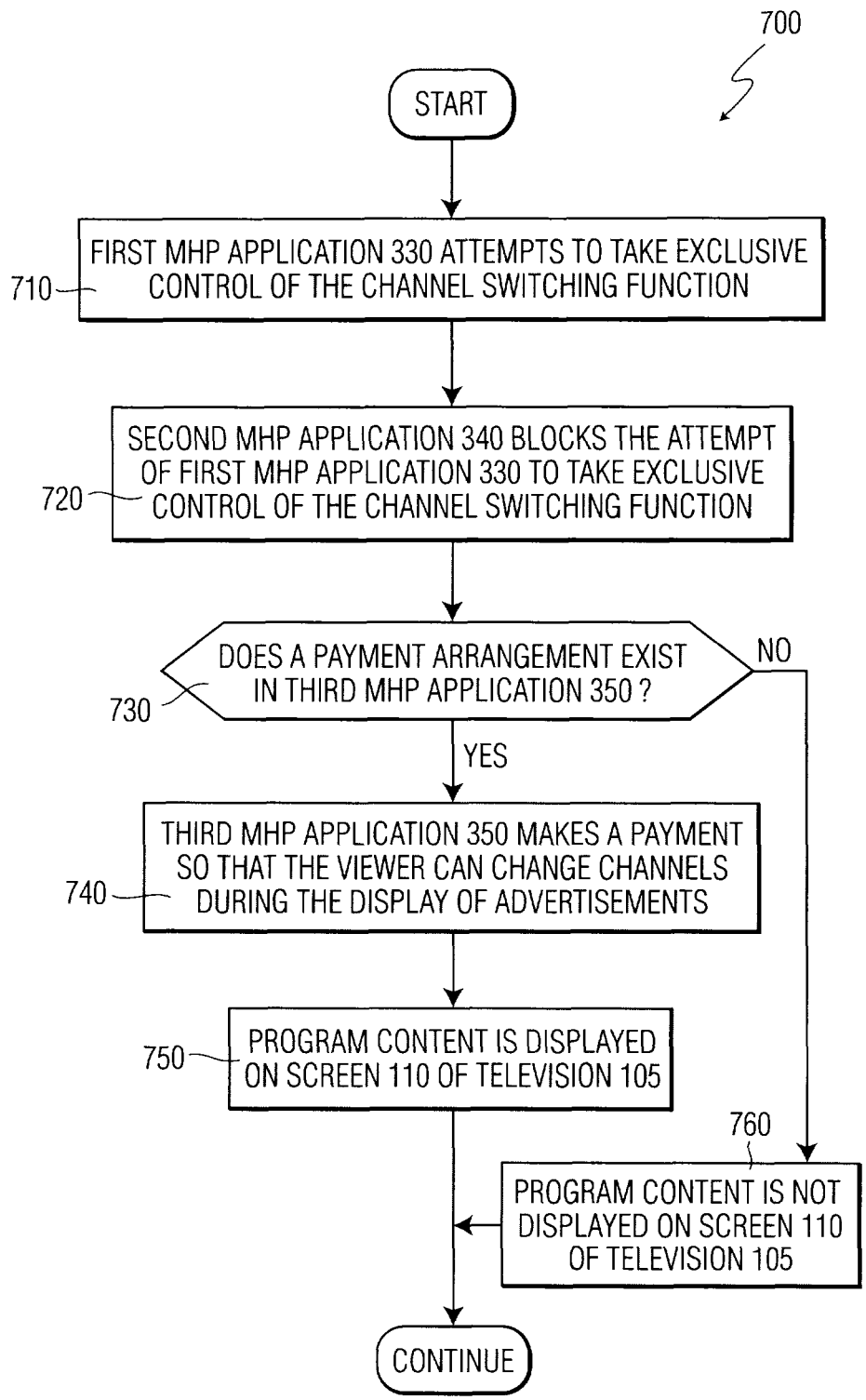
FIG. 7 illustrates a flow diagram of the operation of a method of one advantageous embodiment of the present invention for blocking an attempt to obtain exclusive control over a channel switching function and for making a payment for a viewer to be able to change channels during the display of advertisements.

FIG. 7 depicts flow diagram 700 illustrating the operation of an alternate method of an advantageous embodiment of the present invention of the present invention for preventing a viewer from switching channels when an advertisement is being displayed. In the first step of the method first MHP application 330 attempts to take exclusive control of the channel switching function (step 710). Second MHP application 340 blocks the attempt of first MHP application 330 to take exclusive control of the channel switching function (step 720). A determination is then made whether a payment arrangement exists between the viewer and the broadcaster in third MHP application 250 (decision step 730).

If a payment arrangement exists, then third MHP application 350 makes a payment so that the viewer can change channels during the display of advertisements (step 740). The program content is then displayed on screen 110 of television 105 (step 750) and the method continues. If a payment arrangement does not exist, then the program content is not displayed on screen 110 of television 105 (step 760) and the method continues.

Although the present invention has been described in detail, those skilled in the art should understand that they could make various changes, substitutions and alterations herein without departing from the spirit and scope of the invention in its broadest form.

What is claimed is:

1. An apparatus in a video display system that is configured to at least one of:
    display video programs with advertisements on a plurality of channels and to prevent a viewer of a video program with advertisements from switching from a first channel; and
    display a recorded video program with advertisements and to prevent the viewer of said recorded video program from fast forwarding said recorded video program to skip past advertisements in said recorded video program;
    wherein said video display system is further configured to receive commands from a remote control operated by the viewer through remote control key events, and
    wherein said apparatus comprises:
    an advertisement controller;
    a memory coupled to said advertisement controller; and advertisement control software within said memory,
    wherein, in response to detecting a first control signal in one of the video program and the recorded video program, said advertisement controller is configured to provide a notification to the viewer, and in response to providing the notification, said advertisement controller is configured to determine whether the viewer continues to watch one of the video program and the recorded video program,
    wherein, directly in response to determining that the viewer, after expiration of the notification, continues to watch the one of the video program and the recorded video program, said advertisement controller is configured to execute said advertisement control software to obtain exclusive access to one or more of said remote control key events for taking exclusive control of one of a channel switching function and a fast forwarding function of said video display system to prevent the viewer from the switching or the fast forwarding, and
    wherein, in response to determining that the viewer, prior to the expiration of the notification, does not continues to watch the one of the video program and the recorded video program, said advertisement controller is configured to bypass execution of said advertisement control software.

2. The apparatus as claimed in claim 1, wherein said advertisement control software comprises:
    a Multimedia Home Platform system and Multimedia Home Platform application manager; and
    a first Multimedia Home Platform application that is configured to receive the first control signal, and in response to receiving said first control signal, taking exclusive control of one of: said channel switching function and said fast forwarding function,
    wherein said first Multimedia Home Platform application is further configured to receive a second control signal, and in response to receiving said second control signal, releasing the exclusive control of said one of: said channel switching function and said fast forwarding function.

3. The apparatus as claimed in claim 2, wherein said advertisement control software comprises:
    a second application that is configured to prevent said first Multimedia Home Platform application from obtaining exclusive control of said one of: said channel switching function and said fast forwarding function.

4. The apparatus as claimed in claim 3, wherein said second application comprises one of: Multimedia Home Platform software and a Multimedia Home Platform application.

5. The apparatus as claimed in claim 3, wherein said advertisement control software comprises: a third Multimedia Home Platform application that is configured to send a payment authorization from said viewer to a program broadcaster to authorize said viewer to one of: switch channels during a display of an advertisement in a broadcast video program and fast forward a recorded video program during a display of an advertisement in said recorded video program.

6. A video display system that is configured to display video programs with advertisements on a plurality of channels, said video display system comprising an apparatus according to any of the preceding claims.

7. A method for requiring a viewer of a video program to watch advertisements in said video program, said method comprising at least one of acts of:
    displaying video programs with advertisements on a plurality of channels in a video display system and preventing said viewer from switching from a first channel to a second channel when an advertisement is displayed on said first channel; and displaying a recorded video program with advertisements on said video display system, and preventing a viewer of said recorded video program from fast forwarding said recorded video program to skip past advertisements in said recorded video program;
wherein said video display system is configured to:
receive commands from a remote control operated by a viewer through remote control key events,
detecting a first control signal in one of the video program and the recorded video program;
in response to the detecting act, providing a notification to the viewer;
in response to providing the notification, determining whether the viewer continues to watch one of the video program and the recorded video program;
directly in response to the act of determining that the viewer, after expiration of the notification, continues to watch the one of the video program and the recorded video program by the determining act, executing an advertisement control software stored in a memory coupled to an advertisement controller of said video display system to obtain exclusive access to one or more of said remote control key events for taking exclusive control of one of: a channel switching function of said video display system and a fast forwarding function of said video display system to prevent the viewer from the switching or the fast forwarding; and
in response to the act of determining that the viewer, prior to the expiration of the notification, does not continue to watch the one of the video program and the recorded video program by the determining act, bypassing the act of executing said advertisement control software.

8. The method as claimed in claim 7, further comprising acts of:
providing a Multimedia Home Platform system and Multimedia Home Platform application manager in said advertisement control software; and
providing a first Multimedia Home Platform application that is configured to receive the first control signal and a second control signal;
in response to receiving said first control signal, causing said first Multimedia Home Platform application to take exclusive control of one of: said channel switching function and said fast forwarding function; and
in response to receiving said second control signal, causing said first Multimedia Home Platform application to release said exclusive control of said one of: said channel switching function and said fast forwarding function.

9. The method as claimed in claim 8, further comprising acts of:
providing a second application in said advertisement control software; and
causing said second application to prevent said first Multimedia Home Platform application from obtaining exclusive control of said one of: said channel switching function and said fast forwarding function.

10. The method as claimed in claim 9, wherein said second application comprises one of: Multimedia Home Platform software and a Multimedia Home Platform application.

11. The method as claimed in claim 9, further comprising acts of:
providing a third Multimedia Home Platform application in said advertisement control software; and
causing said third Multimedia Home Platform application to send a payment authorization from said viewer to a program broadcaster to authorize said viewer to one of: switch channels during a display of an advertisement in a broadcast video program and fast forward a recorded video program during a display of an advertisement in said recorded video program.

12. A non-transitory computer-readable storage medium comprising computer instructions which, when executed by a processor, configure the processor to require a viewer of a video program to watch advertisements in said video program, including causing performance of at least one of the acts of:
displaying video programs with advertisements on a plurality of channels in a video display system and preventing said viewer from switching from a first channel to a second channel when an advertisement is displayed on said first channel; and
displaying a recorded video program with advertisements on said video display system, and preventing a viewer of said recorded video program from fast forwarding said recorded video program to skip past advertisements in said recorded video program;
wherein said video display system is configured to receive commands from a remote control operated by a viewer through remote control key events, and
wherein said computer-executable instructions further configure the processor to cause performance of acts of:
detecting a first control signal in one of the video program and the recorded video program;
in response to the detecting act, providing a notification to the viewer;
in response to providing the notification, determining whether the viewer, after expiration of the notification, continues to watch one of the video program and the recorded video program;
directly in response to the act of determining that the viewer continues to watch the one of the video program and the recorded video program by the determining act, accessing an advertisement control software that is located within a memory coupled to an advertisement controller in said video display system, and executing said advertisement control software with said advertisement controller to cause said advertisement controller to obtain exclusive access to one or more of said remote control key events for taking exclusive control of one of: a channel switching function of said video display system and a fast forwarding function of said video display system to prevent the viewer from the switching or the fast forwarding; and
in response to the act of determining that the viewer, prior to the expiration of the notification, does not continue to watch the one of the video program and the recorded video program by the determining act, bypassing the act of executing said advertisement control software.

13. The non-transitory computer-readable storage medium as claimed in claim 12, wherein said computer-executable instructions further configure the processor to cause performance of acts of:
accessing a Multimedia Home Platform system and Multimedia Home Platform application manager in said advertisement control software;
accessing a first Multimedia Home Platform application that is configured to receive the first control signal and a second control signal;
in response to receiving said first control signal, causing said first Multimedia Home Platform application to take exclusive control of one of: said channel switching function and said fast forwarding function; and in response to receiving said second control signal, causing said first Multimedia Home Platform application to release said exclusive control of said one of: said channel switching function and said fast forwarding function.

14. The non-transitory computer-readable storage medium as claimed in claim 13, wherein said computer-executable instructions further configure the processor to cause performance of acts of:
    accessing a second application in said advertisement control software; and
    causing said second application to prevent said first Multimedia Home Platform application from obtaining exclusive control of said one of: said channel switching function and said fast forwarding function.

15. The non-transitory computer-readable storage medium as claimed in claim 14, wherein said second application comprises one of: Multimedia Home Platform software and a Multimedia Home Platform application.

16. The non-transitory computer-readable storage medium as claimed in claim 14, wherein said computer-executable instructions further configure the processor to cause performance of acts of:
    accessing a third Multimedia Home Platform application in said advertisement control software; and
    causing said third Multimedia Home Platform application to send a payment authorization from said viewer to a program broadcaster to authorize said viewer to one of: switch channels during a display of an advertisement in a broadcast video program and fast forward a recorded video program during a display of an advertisement in said recorded video program.

* * * * *